(12) United States Patent
Sugisaka et al.

(10) Patent No.: US 9,360,718 B2
(45) Date of Patent: Jun. 7, 2016

(54) LIQUID CRYSTAL DISPLAY PANEL

(71) Applicant: Sharp Kabushiki Kaisha, Osaka-shi, Osaka (JP)

(72) Inventors: Akane Sugisaka, Osaka (JP); Akihiro Shohraku, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/379,854

(22) PCT Filed: Mar. 22, 2013

(86) PCT No.: PCT/JP2013/058222
§ 371 (c)(1),
(2) Date: Aug. 20, 2014

(87) PCT Pub. No.: WO2013/146567
PCT Pub. Date: Oct. 3, 2013

(65) Prior Publication Data
US 2015/0002777 A1 Jan. 1, 2015

(30) Foreign Application Priority Data
Mar. 30, 2012 (JP) .................................. 2012-081876

(51) Int. Cl.
*G02F 1/1345* (2006.01)
*G02F 1/1362* (2006.01)
*G02F 1/1339* (2006.01)
(Continued)

(52) U.S. Cl.
CPC .......... *G02F 1/13452* (2013.01); *G02F 1/1345* (2013.01); *G02F 1/134336* (2013.01);
(Continued)

(58) Field of Classification Search
CPC ................... G02F 1/134336; G02F 1/136209; G02F 1/136286; G02F 2001/134318; G02F 1/134363; G02F 1/1345; G02F 1/1339; G02F 2001/134372; G02F 1/133512; G02F 2001/13629
See application file for complete search history.

(56) References Cited

U.S. PATENT DOCUMENTS

2010/0072469 A1 3/2010 Yamazaki et al.
2012/0249916 A1 10/2012 Nagano et al.

FOREIGN PATENT DOCUMENTS

JP 2009-069332 A 4/2009
JP 2010-49185 A 3/2010
JP 2012-203348 A 10/2012

OTHER PUBLICATIONS

Official Communication issued in International Patent Application No. PCT/JP2013/058222, mailed on May 28, 2013.

*Primary Examiner* — Dung Nguyen
(74) *Attorney, Agent, or Firm* — Keating & Bennett, LLP

(57) ABSTRACT

The present invention provides a liquid crystal display panel capable of preventing the occurrence of display unevenness in the perimeter of the display area in the FFS mode. The liquid crystal display panel of the present invention includes a pair of substrates; a sealing material; and a liquid crystal layer enclosed by the pair of substrates and the sealing material. One of the pair of substrates includes a pixel electrode provided with multiple slits, and a flat plate-shaped common electrode located on a different layer from the pixel electrode, with an insulating film between the pixel electrode and the common electrode; a non-display area includes a gate driver, multiple gate lead-out wires extending from the gate driver toward a display area, and a common lead-out wire electrically connected to the common electrode; the common lead-out wire intersects the multiple gate lead-out wires; and the common electrode covers an area between the common lead-out wire intersecting the multiple gate lead-out wires and a part of the perimeter of the display area along the common lead-out wire.

16 Claims, 10 Drawing Sheets

(51) Int. Cl.
*G02F 1/1343* (2006.01)
*G02F 1/1335* (2006.01)

(52) U.S. Cl.
CPC .... *G02F1/136209* (2013.01); *G02F 1/136286* (2013.01); *G02F 1/1339* (2013.01); *G02F 1/133512* (2013.01); *G02F 1/134363* (2013.01); *G02F 2001/13629* (2013.01); *G02F 2001/134318* (2013.01); *G02F 2001/134372* (2013.01)

LIQUID CRYSTAL DISPLAY PANEL

TECHNICAL FIELD

The present invention relates to a liquid crystal display panel. More specifically, the present invention relates to a liquid crystal display panel including a substrate including electrodes on multiple layers arranged with an insulating film therebetween.

BACKGROUND ART

A liquid crystal display panel is a device that controls transmission/shielding of light (on/off of the display) by controlling the alignment of birefringent liquid crystal molecules. Examples of liquid crystal alignment modes of the liquid crystal display panel include a TN (twisted nematic) mode in which liquid crystal molecules having positive anisotropy of dielectric constant are aligned in a twisted state at 90° when seen from the normal direction of the substrate; a VA (vertical alignment) mode in which liquid crystal molecules having negative anisotropy of dielectric constant are vertically aligned relative to the substrate surface; and an IPS (in-plane switching) mode and an FFS (fringe field switching) mode in which liquid crystal molecules having positive or negative anisotropy of dielectric constant are horizontally aligned relative to the substrate surface, and a transverse electric field is applied to the liquid crystal layer.

As a method for driving a liquid crystal display panel, an active matrix-type driving method is widely used in which an active element such as a thin film transistor (TFT) is provided in each pixel to achieve high image quality. In the substrate provided with the TFTs (hereinafter also referred to as "TFT substrate"), multiple gate signal lines and multiple source signal lines are formed so as to intersect each other, and the TFT is provided at every intersection. Each TFT is connected to each pixel electrode, and the supply of an image signal to the pixel electrode is controlled by a switching function of the TFT. The TFT substrate or a counter substrate further includes a common electrode, and a voltage is applied to the liquid crystal layer through the pair of electrodes.

Among the modes for controlling the alignment of liquid crystal molecules through application of a transverse electric field, the FFS mode is a liquid crystal alignment mode in which the aperture ratio is improved by improving the IPS mode (for example, see Patent Literature 1). In the FFS mode, each pixel area includes a common electrode formed from a transparent material such as indium tin oxide (ITO) as an electrode opposing the pixel electrode. A common wire for supplying a common signal is connected to the common electrode. The pixel electrode is also formed from a transparent material such as ITO, and multiple slits are formed in a stripe pattern in the pixel electrode. An insulating film is disposed between the pixel electrode and the common electrode. When a voltage is applied between the pixel electrode and the common electrode, not only a transverse electric field but also a vertical electric field are generated due to the slits provided in the pixel electrode. Thus, it is possible to control not only the alignment of liquid crystal molecules located on the slits but also the alignment of the liquid crystal molecules located on the electrodes, thus resulting in an improved aperture ratio as compared to the IPS mode.

Patent Literature 1 discloses the following point as a factor by which an image sticking phenomenon easily occurs, as compared to the IPS mode, when the FFS mode is used for a long period of time: in the FFS mode, the path of the electric lines of force extending from the pixel electrode to the liquid crystal layer is asymmetric to the path of the electric lines of force extending from the liquid crystal layer to the gate signal line, and the liquid crystal layer is thus irreversibly affected by a direct electric field resulting from signals applied to the gate signal line. In order to prevent image sticking resulting from a voltage applied to the gate signal line, a shield electrode extending in the same direction as the gate signal line is used to block the electric lines of force extending from the pixel electrode to the gate signal line, which are generated from a high voltage signal applied to the gate signal line. Further, because a potential of a shield electrode layer becomes unstable when the shield electrode is in floating state, the shield electrode and the common wire are interconnected in order to stabilize the potential of the shield electrode.

CITATION LIST

Patent Literature
Patent Literature 1: JP-A 2009-69332

SUMMARY OF INVENTION

Technical Problem

While the present inventors were developing a liquid crystal display panel of the FFS mode, they found that purplish display unevenness occurs at portions of the perimeter of the display area when the display is turned on. The present inventors focused on the fact that display unevenness occurs at every position corresponding to a gate block, and in order to determine the cause, they applied a gate voltage (Vgl) not only to gate lead-out wires but also to floating island areas where the gate lead-out wires are not formed. As a result, the range of the display unevenness changed.

FIG. 16 and FIG. 17 are plan schematic views showing the occurrence of display unevenness near the gate lead-out wires. The liquid crystal display panel usually includes a display area where the pixel electrode and the like are arranged, and a non-display area outside of the perimeter (bold line) of the display area. As shown in FIG. 16, in the non-display area, a gate driver 151 is arranged along one side of the display area, and gate lead-out wires 112 are led out from the gate driver 151. The areas surrounded by dotted lines in FIG. 16 and FIG. 17 are where display unevenness occurs. Usually, a gate voltage is not applied to areas (floating island areas) 101 other than the areas where the gate lead-out wires 112 are arranged. Yet, as shown in FIG. 17, the application of a gate voltage resulted in an increase in the area where display unevenness occurs. Based on the above, the present inventors considered that a voltage applied to the gate lead-out wires 112 located in the non-display area affects not only the liquid crystal molecules outside the display area but also the liquid crystal molecules inside the display area.

The present invention was accomplished in view of the current situation described above, and an object thereof is to provide a liquid crystal display panel capable of preventing the occurrence of display unevenness in the perimeter of the display area in the FFS mode.

Solution to Problem

The present inventors examined various means to prevent the occurrence of display unevenness near the perimeter of the display area, and consequently focused on a flat plate-shaped common electrode formed on a substrate on which the pixel electrode is formed, which is unique to the FFS mode.

The present inventors also focused on the fact that the conventional common electrode only needed to cover at least the display area and was not formed to cover a large area in the non-display area. Then, the present inventors found that it is possible to suppress alignment disturbance of liquid crystal molecules induced by a gate voltage and to prevent the occurrence of display unevenness near the perimeter of the display area, by extending the range of the common electrode toward the side where the gate driver is located, from the display area to at least the area where a common lead-out wire is located. Consequently, the present inventors found that the above problem can be successfully solved and arrived at the present invention.

Specifically, an aspect of the present invention is a liquid crystal display panel including a pair of substrates; a sealing material; and a liquid crystal layer enclosed by the pair of substrates and the sealing material, wherein one of the pair of substrates includes a pixel electrode provided with multiple slits, and a flat plate-shaped common electrode located on a different layer from the pixel electrode, with an insulating film between the pixel electrode and the common electrode; a non-display area includes a gate driver, multiple gate lead-out wires extending from the gate driver toward a display area, and a common lead-out wire electrically connected to the common electrode; the common lead-out wire intersects the multiple gate lead-out wires; and the common electrode covers an area between the common lead-out wire intersecting the multiple gate lead-out wires and a part of the perimeter of the display area along the common lead-out wire.

The liquid crystal display panel includes a pair of substrates, a sealing material, and a liquid crystal layer enclosed by the pair of substrates and the sealing material, wherein one of the pair of substrates includes a pixel electrode provided with multiple slits, and a flat plate-shaped common electrode located on a different layer from the pixel electrode, with an insulating film between the pixel electrode and the common electrode. The pixel electrode includes multiple slits, and the common electrode has a flat plate shape. Thus, it is possible to generate a fringe electric field in the liquid crystal layer through these electrodes. In other words, the alignment mode of the above liquid crystal display panel is a form of the FFS mode.

The liquid crystal display panel is divided into a display area and a non-display area. The display area is an area where a desired image is displayed. The non-display area is an area where no image is displayed. The non-display area includes a gate driver and multiple gate lead-out wires extending from the gate driver toward the display area. For example, in the case where the display area is formed in a rectangular shape, it suffices as long as the multiple gate lead-out wires are led out with respect to at least one side of the display area, or the multiple gate lead-out wires may be led out with respect to multiple sides.

The non-display area includes a common lead-out wire electrically connected to the common electrode, and the common lead-out wire intersects the multiple gate lead-out wires. The common lead-out wire is a bus line for supplying a common potential to the common electrode. For example, in the case where the display area is formed in a rectangular shape, it suffices as long as the common lead-out wire is provided along at least one side of the display area, or the common lead-out wire may be provided so as to surround the outside of the perimeter of the display area.

The common electrode covers an area between the common lead-out wire intersecting the multiple gate lead-out wires and a part of the perimeter of the display area along the common lead-out wire. Owing to the fact that the common electrode covers the above area, the occurrence of disturbance of liquid crystal alignment due to a gate voltage can be effectively reduced, contributing to the prevention of the occurrence of display unevenness.

The configuration of the liquid crystal display panel of the present invention is not particularly limited by other components as long as it essentially includes the above-described components.

Preferred embodiments of the liquid crystal display panel are described in detail below. An embodiment shown below combining two or more preferred embodiments of the liquid crystal display panel is also a preferred embodiment of the liquid crystal display panel.

Preferably, the sealing material is provided at a position further away from the display area than the common lead-out wire; a part of the sealing material intersects the multiple gate lead-out wires; and the common electrode further covers an area between a part of the sealing material intersecting the multiple gate lead-out wires and the common lead-out wire along a part of the perimeter of the display area. Thus, the entire area where the liquid crystal layer and the gate lead-out wires overlap each other can be covered with the common electrode, thus more reliably reducing the occurrence of disturbance of liquid crystal alignment due to a gate voltage, and significantly contributing to the prevention of display unevenness.

Preferably, the sealing material is provided at a position further away from the display area than the common lead-out wire; a part of the sealing material intersects the multiple gate lead-out wires; and an electrode isolated from the common electrode and electrically connected to the common electrode covers an area between a part of the sealing material intersecting the multiple gate lead-out wires and the common lead-out wire along a part of the perimeter of the display area. Examples of the electrode isolated from the common electrode and electrically connected to the common electrode include (i) an electrode located on the same layer as the pixel electrode, (ii) an electrode located on the same layer as the common electrode, and (iii) an electrode located on the same layer as the common lead-out wire. Thus, the entire area where the liquid crystal layer and the gate lead-out wires overlap each other can be covered with the electrode electrically connected to the common electrode, thus more reliably reducing the occurrence of disturbance of liquid crystal alignment due to a gate voltage, and significantly contributing to the prevention of display unevenness, as is the case with the common electrode. Examples of means of electrically connecting the common electrode to the electrode isolated from the common electrode and electrically connected to the common electrode include means of arranging the electrodes in such a manner that each electrode at least partially overlaps each other while forming a contact portion in a part of the insulating film between each electrode.

In addition, the common electrode and the electrode isolated from the common electrode and electrically connected to the common electrode may be used in combination in order to cover the area where the liquid crystal layer and the gate lead-out wires overlap each other. In other words, preferably, the sealing material is provided at a position further away from the display area than the common lead-out wire; a part of the sealing material intersects the multiple gate lead-out wires; and a combination of the common electrode and an electrode isolated from the common electrode and electrically connected to the common electrode covers an area between a part of the sealing material intersecting the multiple gate lead-out wires and the common lead-out wire along a part of the perimeter of the display area. Thus, as is the case with the use of the each electrode alone, the occurrence of disturbance of liquid crystal alignment due to a gate voltage can be more reliably reduced, significantly contributing to the prevention of display unevenness. Depending on the design, there is a case where it is more advantageous to cover the area where the liquid crystal layer and the gate lead-out wires overlap each other by interconnecting the electrodes located on different layers, rather than using only the electrodes located on the same layer.

In the case where the counter substrate includes a black matrix, the sealing material may or may not overlap the black matrix. Yet, allowing the sealing material to overlap the black matrix makes it easier to achieve a narrow frame, which can be easily applied to small- and medium-sized liquid crystal displays. However, for example, in the case where the sealing material overlaps the black matrix, and the sealing material overlaps light-shielding electrodes such as the gate lead-out wires, ultraviolet irradiation for curing the sealing material is blocked by the gate lead-out wires and the like. Arranging the sealing material and the black matrix in a non-overlapping manner allows the sealing material to be irradiated with ultraviolet light through the substrate in which the gate lead-out wires are not formed, thus allowing the sealing material to be quickly and reliably cured.

In the case where the sealing material at least partially overlaps the black matrix, an electrode located on the same layer as the multiple gate lead-out wires and overlapping the sealing material is preferably provided with a slit. In the case where the sealing material and the black matrix are arranged to partially or entirely overlap each other, slits are made in advance in an electrode that overlaps the sealing material. This allows the sealing material to be irradiated with ultraviolet light through the substrate in which the gate lead-out wires are formed.

The number of the gate drivers does not necessarily need to be one for one liquid crystal display panel. For example, in the case where the display area is formed in a rectangular shape, two gate drivers may be separately arranged in two areas facing each other, with the display area therebetween. In such a case, all the multiple gate lead-out wires led out from both gate drivers are preferably covered with the common electrode and the like. In other words, preferably, the gate driver is a first gate driver, the multiple gate lead-out wires led out from the gate driver are first multiple gate lead-out wires, an area across the display area from the first gate drivers is provided with a second gate driver, second multiple gate lead-out wires extending from the second gate driver toward the display area, and a second common lead-out wire electrically connected to the common electrode, the second common lead-out wire intersects the second multiple gate lead-out wires, and the common electrode covers an area between the second common lead-out wire intersecting the second multiple gate lead-out wires and a part of the perimeter of the display area along the second common lead-out wire.

Advantageous Effects of Invention

According to the liquid crystal display panel of the present invention, in the case where the FFS mode is employed, the occurrence of display unevenness near the perimeter of the display area can be prevented even when a gate voltage is applied to control driving of pixels.

DESCRIPTION OF EMBODIMENTS

Figure 1:
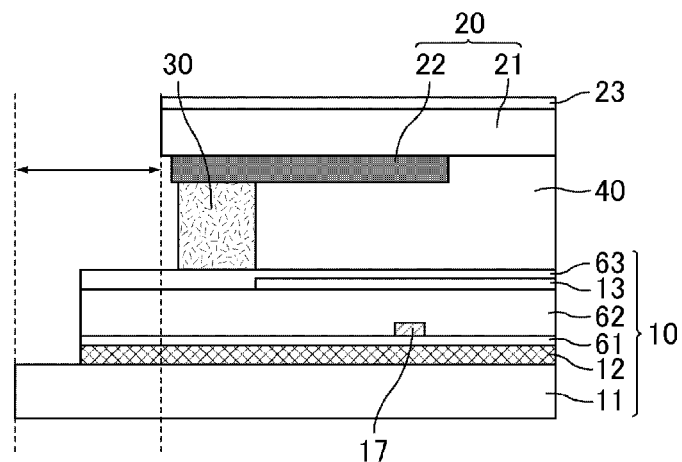
FIG. 1 is a cross sectional schematic view showing a liquid crystal display panel of Embodiment 1.

The present invention will be described in more detail referring to the drawings in the following embodiments, but is not limited to these embodiments.

As used herein, the term "electrode" encompasses meaning equivalent to so-called "wires".

As used herein, the term "gate signal line" refers to a wire for supplying a gate signal, the term "source signal line" is a wire for supplying a source signal, and the term "common signal line" refers to a wire for supplying a common signal. Among these, particularly, a source signal line that runs through the non-display area is also referred to as a "source lead-out wire", and a common signal line that runs through the non-display area is also referred to as a "common lead-out wire".

Liquid crystal display panels of Embodiments 1 to 4 shown below are specifically applicable to a liquid crystal display panel of a television, personal computer, mobile phone, automotive navigation system, information display, or the like.

Embodiment 1

FIG. 1 is a cross sectional schematic view showing a liquid crystal display panel of Embodiment 1. The liquid crystal display panel of Embodiment 1 includes a TFT substrate 10, a counter substrate 20, a sealing material 30, and a liquid crystal layer 40, wherein the liquid crystal layer 40 is enclosed by the TFT substrate 10, the counter substrate 20, and the sealing material 30. The liquid crystal layer 40 contains liquid crystal molecules. When voltage is not applied, the liquid crystal molecules are horizontally aligned relative to each of the surfaces of the substrates 10 and 20. The TFT substrate 10 includes a supporting substrate 11, a TFT, gate signal lines (including gate lead-out wires) 12, a source signal line (including a source lead-out wire), a common signal line (including a common lead-out wire), a common electrode 13, a pixel electrode, and the like. An area indicated by a double-headed arrow in each of FIG. 1 and other figures particularly represents a "terminal area" in which a gate driver, a source driver, and the like are arranged, within the non-display area.

An insulating film (a first insulating film) 61 is formed between a layer on which the gate signal lines 12 are located and a layer on which the source signal line is located. An insulating film (a second insulating film) 62 is formed between the layer on which the source signal line is located and a layer on which the common electrode 13 is located. An insulating film (a third insulating film) 63 is formed between the layer on which the common electrode 13 is located and a layer on which a pixel electrode 14 is located. Each of the first insulating film 61, the second insulating film 62, and the third insulating film 63 may be formed of a single layer or multiple layers.

The counter substrate 20 includes a supporting substrate 21, color filters, and a black matrix 22. The color filters and the black matrix 22 are arranged on the liquid crystal layer side of the supporting substrate 21. The color filters and the black matrix 22 may be provided on the TFT substrate 10 instead of the counter substrate 20. The black matrix 22 is formed so as to overlap the sealing material 30. A shield electrode 23 formed from ITO or the like is arranged on the supporting substrate 21, on the side opposite to the liquid crystal layer. The shield electrode 23 can prevent the liquid crystal from being affected by external static electricity, electrical signal (noise), and the like. From the viewpoint of stabilizing the potential, the shield electrode 23 is preferably connected to a metal member outside a panel via an electrically conductive tape or the like. Yet, there is no need to apply a constant voltage to the shield electrode 23. The shield electrode 23 is covered with a polarizer (described later).

As shown in FIG. 1, the common electrode 13 is extended to a point where it overlaps the sealing material 30 in the non-display area. As a result, the common electrode 13 is arranged so as to cover the space between the gate lead-out wires 12 and the liquid crystal layer 40, so that the occurrence of disturbance of liquid crystal alignment due to a gate voltage can be reduced.

Figure 2:
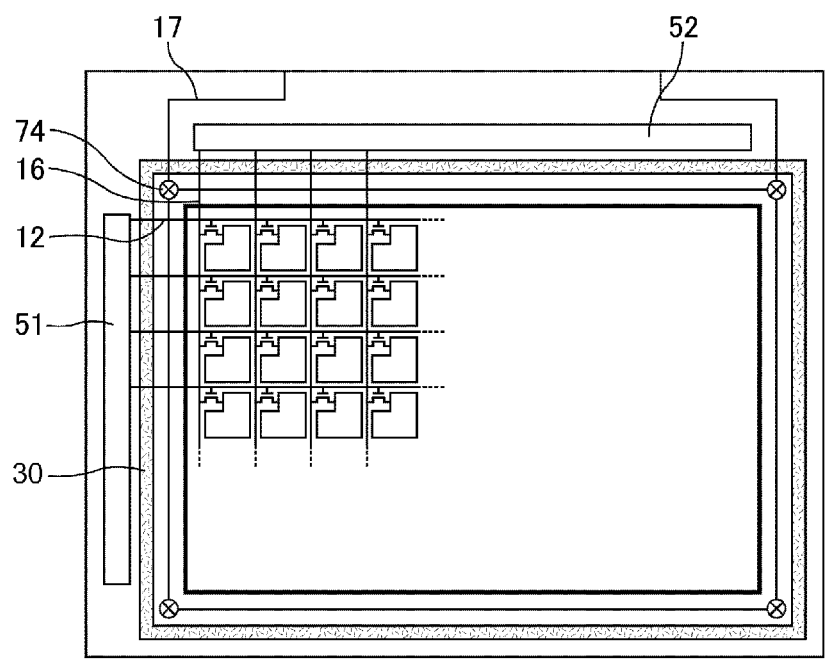
FIG. 2 is a plan schematic view showing the liquid crystal display panel of Embodiment 1.
Figure 3:
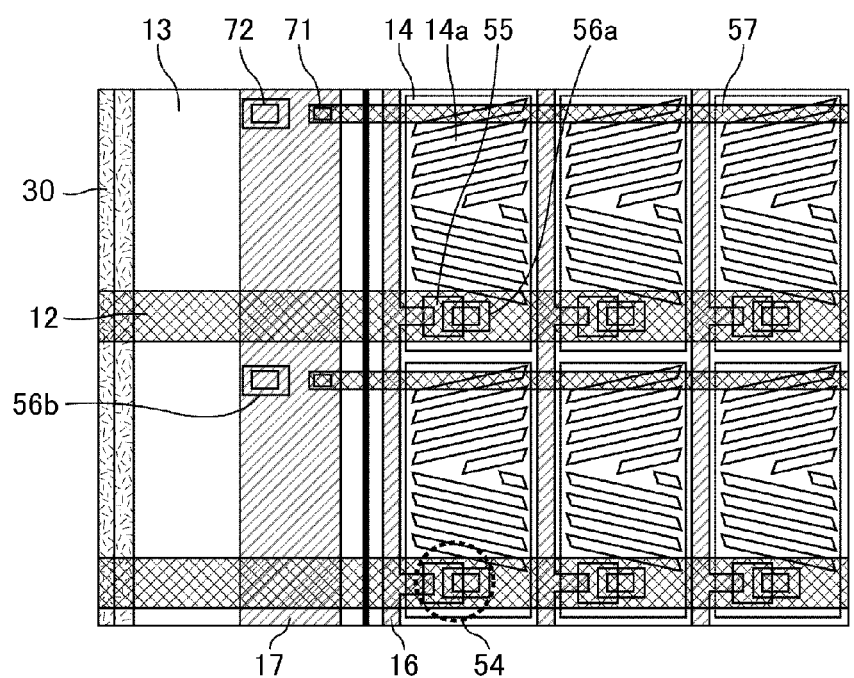
FIG. 3 is an enlarged plan schematic view showing an area near the boundary between a display area and a non-display area in the liquid crystal display panel of Embodiment 1.

FIG. 2 is a plan schematic view showing the liquid crystal display panel of Embodiment 1. The area surround by a bold line in FIG. 2 is the display area, and the area other than the display area is the non-display area. FIG. 3 is an enlarged plan schematic view showing an area near the boundary between the display area and the non-display area in the liquid crystal display panel of Embodiment 1.

As shown in FIG. 2, the non-display area includes a gate driver 51, the multiple gate lead-out wires 12 extending from the gate driver 51 toward the display area, a source driver 52, multiple source lead-out wires 16 extending from the source driver 52 toward the display area, and a common lead-out wire 17 extending so as to surround the display area and capable of being electrical continuity with the outside. The common lead-out wire 17 is formed so as to extend through multiple layers. In the example shown in FIG. 2, the common lead-out wire arranged along the short sides of the display area is formed on the same layer as the source lead-out wires 16, and the common lead-out wire arranged along the long sides of the display area and the common lead-out wire led out to the outside are formed on the same layer as the gate lead-out wires 12. The common lead-out wires located on these layers are interconnected via a contact portion 74 provided in the insulating film.

Figure 5:
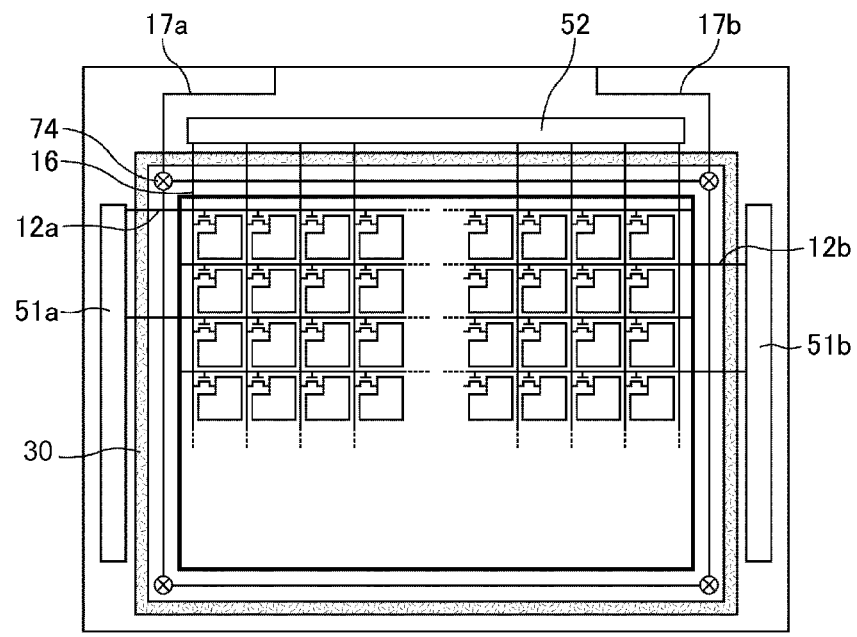
FIG. 5 is a plan schematic view showing a first modified example of the liquid crystal display panel of Embodiment 1.

A gate signal is supplied toward the display area through the multiple gate lead-out wires 12 led out from the gate driver 51. In addition, a source signal is supplied toward the display area through the multiple source lead-out wires 16 led out from the source driver 52. The gate driver 51 is formed along one side of the rectangular display area, and the source driver 52 is formed along another side of the rectangular display area. In the example shown in FIG. 2, neither the gate driver nor the source driver is arranged along the remaining two sides of the display area. Yet, depending on the design, as shown in FIG. 5, two gate drivers (a first gate driver 51a and a second ˆgate driver 51b) may be formed along the two opposing sides (the first modified example). In this case, the common electrode is preferably extended so as to overlap both gate lead-out wires (i.e., a first gate lead-out wire 12a and a second gate lead-out wire 12b) led out from the sides across the display area. In the first modified example, the gate lead-out wires 12a and 12b led out from the gate drivers 51a and 51b, respectively, are led out toward the display area in an alternating manner.

In Embodiment 1, a common signal is supplied to the common electrode 13 through the common lead-out wire 17 led out to the outside. Examples of members that supply a common signal to the common lead-out wire 17 include an external driver equipped with a common signal output circuit. The common lead-out wire 17 intersects the gate lead-out wires 12 and the source lead-out wires 16, via an insulating film. In the example shown in FIG. 2, the common lead-out wire 17 is provided so as to surround the outside of the perimeter of the display area, but the common lead-out wire 17 does not necessarily need to be provided along the all sides of the display area. In the example shown in FIG. 4, the common lead-out wire 17 running through the area to the left of the display area corresponds to a first common lead-out wire 17a, and the common lead-out wire running through the area to the right of the display area corresponds to a second common lead-out wire 17b. Yet, these common lead-out wires are integrated in the structure.

At the same time, as shown in FIG. 3, when the TFT substrate in Embodiment 1 is seen in a plan view, the gate signal lines 12 and the source signal lines 16 are formed so as to intersect each other and to surround the pixel electrode 14 in the display area. A TFT (thin film transistor) 54 is provided in the vicinity of each contact point between the gate signal lines 12 and the source signal lines 16. The vertical bold line shown in FIG. 3 is a boundary between the display area (right side) and the non-display area (left side).

The TFT 54 is a switching element provided with a semiconductor layer 55 and three electrodes (a gate electrode, a source electrode, and a drain electrode). The drain electrode is connected to the pixel electrode 14 via a contact portion that passes through the second insulating film and the third insulating film. The gate electrode and the semiconductor layer 55 overlap via a gate insulating film. The source electrode is connected to the source signal lines 16, and is also connected to the drain electrode via the semiconductor layer 55. At the timing when a gate voltage is applied to the gate electrode through the gate signal line 12, a source signal inputted from the source signal lines 16 is sequentially supplied to the source electrode, the semiconductor layer 55, the drain electrode, and the pixel electrode 14.

The pixel electrode 14 is an electrode arranged in each area surrounded by two gate signal lines 12 and two source signal lines 16, and each pixel electrode 14 is provided with multiple slits 14a. The shape of the pixel electrode 14 is not particularly limited as long as it can form a fringe electric field between the pixel electrode 14 and the common electrode 13. Examples of the shape include a shape having a comb-shaped perimeter as a result of the formation of multiple slits, and a shape internally provided with multiple slits and having a substantially rectangular perimeter. Because of the multiple slits 14a in the pixel electrode 14, an arc-shaped electric field formed between the pixel electrode 14 and the common electrode 13 is formed in the liquid crystal layer. Each slit 14a is formed so as to extend in a direction inclined by several degrees relative to a direction parallel to the longitudinal direction of the gate signal line 12. The multiple slits 14a are divided into two groups by a line bisecting the long side of the pixel electrode 14, and the two groups are symmetric to each other with respect to the bisecting line. Owing to such a symmetric structure, it is possible to maintain a proper balance of the liquid crystal alignment.

Figure 4:
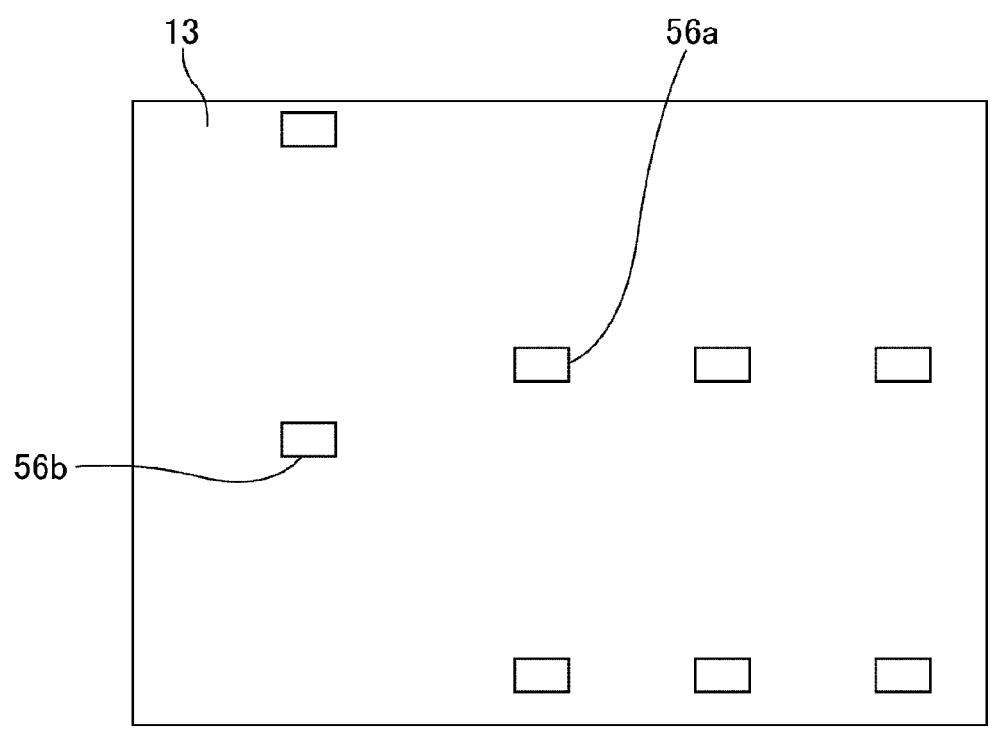
FIG. 4 is a plan schematic view showing only a common electrode shown in FIG. 3.

The common electrode 13 is a flat plate-shaped electrode, and is widely formed regardless of the boundaries of the pixels. FIG. 4 is a plan schematic view showing only the common electrode 13 shown in FIG. 3. The common electrode 13 partially includes openings 56a for securing a path for providing electrical continuity between the TFT 54 and the pixel electrode 14, and openings 56b for providing electrical continuity between the common electrode 13 and the common lead-out wire 17. A constant common signal is supplied to the common electrode 13 through the common lead-out wire 17. A part of the common lead-out wire 17 is arranged on the layer on which the source signal lines 16 are located, and intersects the multiple gate lead-out wires 12 via the first insulating film. In addition, another part of the common lead-out wire 17 is arranged on the layer on which the gate signal line 12 is located, and intersects the multiple source lead-out wires 16 via the first insulating film. The common signal does not necessarily need to be directly supplied from the layer on which the common lead-out wire 17 is located to the common electrode 13. The common signal may be connected to the common electrode 13 via a first common signal line 57 provided in the layer in which the gate signal line 12 is located, or via a second common signal line provided in the layer in which the pixel electrode 14 is located. In the example shown in FIG. 3, the common lead-out wire 17 is connected, via a contact portion 71 provided in the first insulating film, to the first common signal line 57 provided in the layer in which the gate signal line 12 is located. At the same time, the common lead-out wire 17 is connected, via a contact portion 72 provided in the second insulating film, to the second common signal line provided in the layer in which the pixel electrode 14 is located. In other words, the liquid crystal display panel is configured such that the common signal can be supplied from either the layer in which the gate signal line 12 is located or the layer in which the pixel electrode 14 is located. The first common signal line 57 extends along the gate signal line 12 in the same direction. More specifically, each opening 56a in the common electrode 13 is provided to secure a path for providing electrical continuity between the drain electrode of the TFT 54 and the pixel electrode 14. Meanwhile, each opening 56b in the common electrode 13 is provided to secure a path for providing electrical continuity between the common lead-out wire 17 and the second common signal line provided in the layer in which the pixel electrode 14 is located.

As shown in FIG. 1 and FIG. 2, the common electrode 13 in Embodiment 1 is extended to an area where the common electrode 13 overlaps the sealing material 30. In addition, the common electrode 13 covers an area between the sealing material 30 and the perimeter of the display area. As a result, the entire area where the liquid crystal layer 40 overlaps the multiple gate lead-out wires 12 is covered with the common electrode 13. In the example shown in FIG. 1, the design is made such that an end of the common electrode 13 is located along the boundary between the sealing material 30 and the liquid crystal layer 40, taking into account the fact that the sealing material 30 will be easily peeled off if the common electrode 13 is located between the second insulating film 62 and the third insulating film 63.

As a result, display unevenness that occurs near the perimeter of the display area due to application of a gate voltage can be eliminated, resulting in a liquid crystal display panel having good display characteristics.

Figure 6:
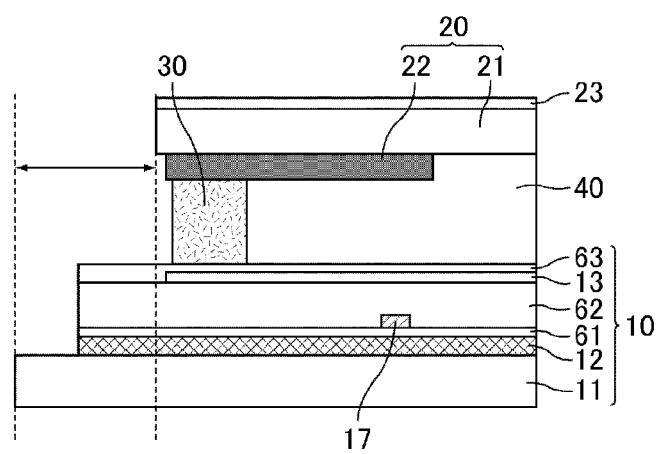
FIG. 6 is a cross sectional schematic view showing a second modified example of the liquid crystal display panel of Embodiment 1.

Another modified example of the liquid crystal display panel of Embodiment 1 may be one in which the common electrode 13 further extends to the outside of the sealing material 30, as shown in FIG. 6 (a second modified example), i.e., the common electrode 13 covers an area where the common electrode 13 overlaps the sealing material 30. Such an arrangement can more reliably reduce the effect of the gate lead-out wires.

Figure 7:
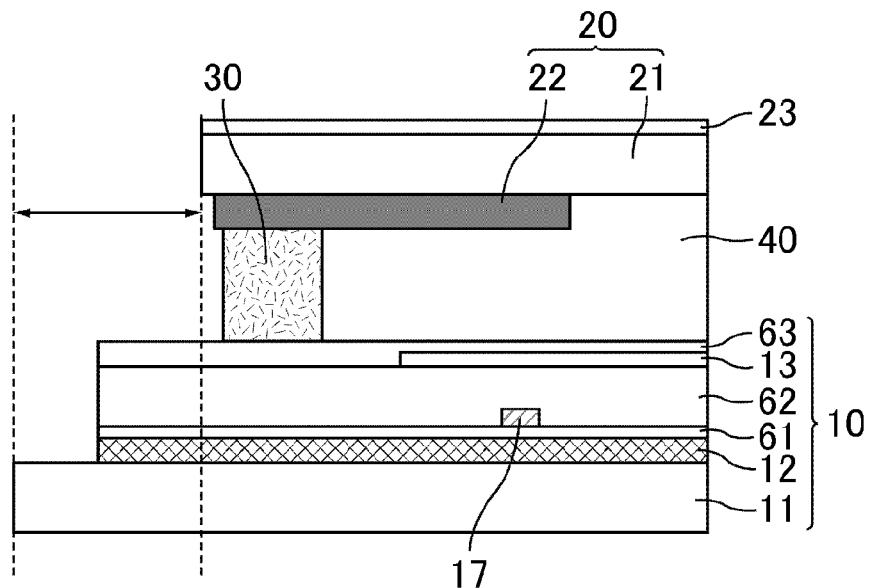
FIG. 7 is a cross sectional schematic view showing a third modified example of the liquid crystal display panel of Embodiment 1.

Another modified example of the liquid crystal display panel of Embodiment 1 may be one in which the common electrode 13 extends to an area inward of the sealing material 30, as shown in FIG. 7 (a third modified example), i.e., an end of the common electrode 13 is located between the sealing material 30 and the common lead-out wire 17. Depending on the design, there is a case where the common electrode 13 cannot be extended to the sealing material 30. Still, such an embodiment can reduce the effect of the gate lead-out wires 12.

Figure 8:
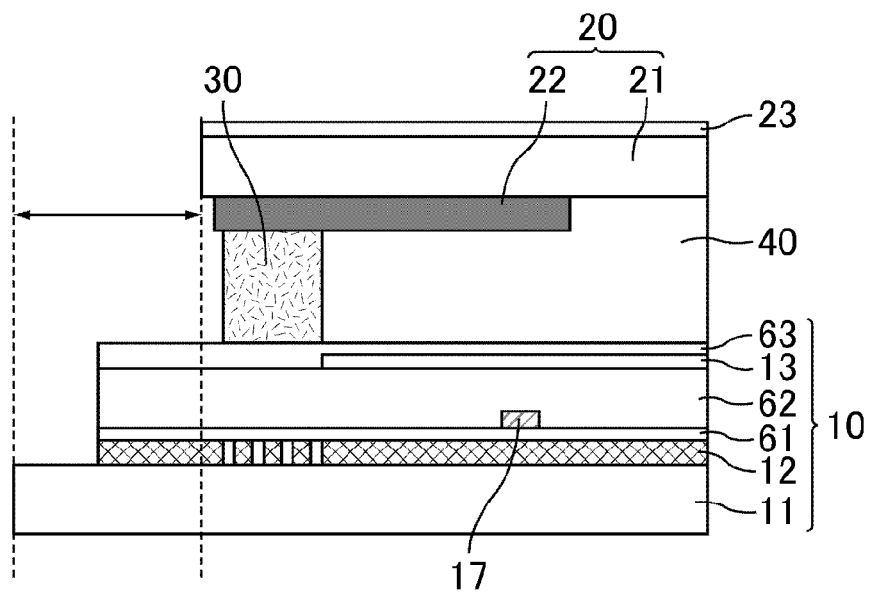
FIG. 8 is a cross sectional schematic view showing a fourth modified example of the liquid crystal display panel of Embodiment 1.
Figure 9:
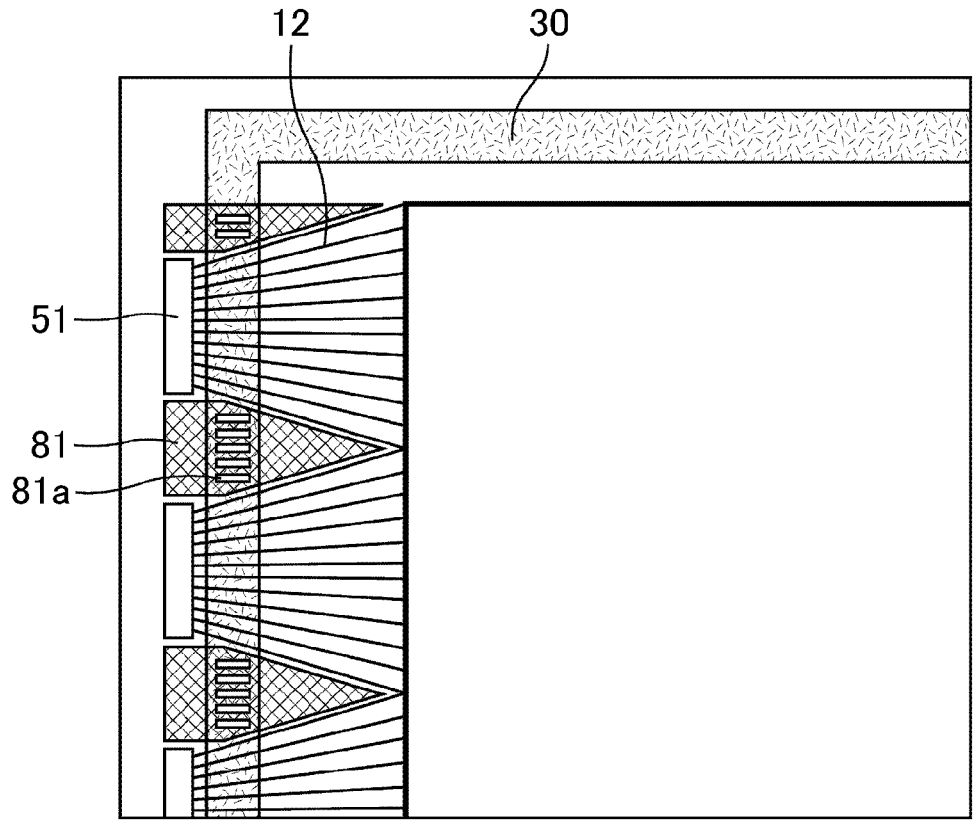
FIG. 9 is a plan schematic view showing the fourth modified example of the liquid crystal display panel of Embodiment 1.

Another modified example of the liquid crystal display panel of Embodiment 1 may be one in which an electrode 81 located in the same layer as the gate lead-out wires 12 and overlapping the sealing material 30 is provided with slits (a fourth modified example), as shown in FIG. 8 and FIG. 9. Providing an area where the sealing material 30 and the black matrix 22 overlap each other makes it possible to achieve a narrow frame, thus obtaining a panel suitable to small- and medium-sized mobile devices and the like. However, when the sealing material 30 and the black matrix 22 partially overlap each other, the sealing material 30 cannot be irradiated with ultraviolet light through the counter substrate 20 for curing. Meanwhile, when the sealing material 30 is irradiated through the TFT substrate 10, the sealing material 30 is cured by light passing through gaps between the gate lead-out wires 12. Yet, curing may be insufficient in the case where an electrode is arranged in the same layer as the gate lead-out wires 12 for the purpose of light shielding as shown in FIG. 9. Therefore, the third modified example is designed in such a manner that multiple slits 81a are formed in an electrode 81 located in the same layer as the gate lead-out wires 12 led out from the gate driver 51 so that the sealing material 30 is irradiated with more ultraviolet light passing through the multiple slits. The ratio of the width of the electrode 81 to the width of each slit 81a is preferably substantially 1:1 (i.e., substantially a 50% aperture ratio). From the same viewpoint, the ratio of the electrode width of each gate lead-out wire 12 to the distance between each gate lead-out wire 12 is preferably substantially 1:1.

Materials of each member and a production method of each member are described below.

A preferred material of the supporting substrates 11 and 21 is a transparent material such as glass or plastic. A preferred material of the first insulating film 61, the second insulating film 62, and the third insulating film 63 is a transparent material such as silicon nitride, silicon oxide, or photosensitive acrylic resin. In addition, the first insulating film 61, the second insulating film 62, and the third insulating film 63 are produced, for example, by forming a silicon nitride film by plasma enhanced chemical vapor deposition (PECVD) and by forming a photosensitive acrylic resin film on the silicon nitride film by die-coating (coating). A hole to be provided through the first insulating film 61, the second insulating film 62, and the third insulating film 63 in order to form a contact portion can be formed by dry etching or the like.

The gate signal line (gate lead-out wire) 12, the source signal line (source lead-out wire) 16, the common signal line (common lead-out wire) 17, and various electrodes forming the TFT 54 can be produced, for example, by forming a single layer or multiple layers of a metal such as titanium, chromium, aluminium, or molybdenum, or an alloy thereof by sputtering or the like, and subsequently by performing patterning by photolithography or the like. These various wires and electrodes to be formed on the same layer are formed from the same materials so as to achieve efficient production.

The semiconductor layer 55 of the TFT 54 preferably includes an oxide semiconductor such as IGZO (indium-gallium-zinc-oxygen). Such an oxide semiconductor has higher electron mobility than conventional amorphous silicon so that the size of the TFT 54 can be reduced. Such oxide semiconductor is particularly suitable to high-definition liquid crystal displays. The semiconductor layer 55 may be a semiconductor layer including amorphous silicon and/or poly-silicon.

The pixel electrode 14 and the common electrode 13 can be patterned by photolithography or the like after forming a single layer or multiple layers of a transparent conductive material such as indium tin oxide (ITO), indium zinc oxide (IZO), zinc oxide (ZnO), or tin oxide (SnO), or an alloy thereof by sputtering or the like. The slits to be provided in the pixel electrode 14 and the openings to be provided in the common electrode 13 can also be simultaneously formed during patterning.

A preferred material of the color filters is photosensitive resin (color resist) that allows transmission of light corresponding to each color. A material of the black matrix 22 is not particularly limited as long as it is a light-shielding material. A resin material containing black pigment or a light-shielding metal material is preferably used as a material of the black matrix 22.

The thus-produced TFT substrate 10 and counter substrate 20 are bonded to each other using the sealing material 30 after multiple column-shaped spacers formed from an insulating material are provided on one of the substrates. The liquid crystal layer 40 is formed in the space enclosed by the TFT substrate 10, the counter substrate 20, and the sealing material 30. In the case of a dropping method, a liquid crystal material is dropped before bonding the substrates 10 and 20 to each other. In the case of a vacuum injection method, a liquid crystal material is injected after the substrates 10 and 20 are bonded to each other. Then, a polarizing plate, a phase difference film, and the like are bonded to the surface of each of the substrates 10 and 20, on the side opposite to the liquid crystal layer 40. Further, the gate driver 51, the source driver 52, and the like are mounted in the terminal area. Thereby, a liquid crystal display panel is completed.

Embodiment 2

A liquid crystal display panel of Embodiment 2 is the same as the liquid crystal display panel of Embodiment 1, except that the space between the common lead-out wire and the seal area is covered with an electrode that is not the common electrode and that is isolated from the common electrode and is electrically connected to the common electrode.

Figure 10:
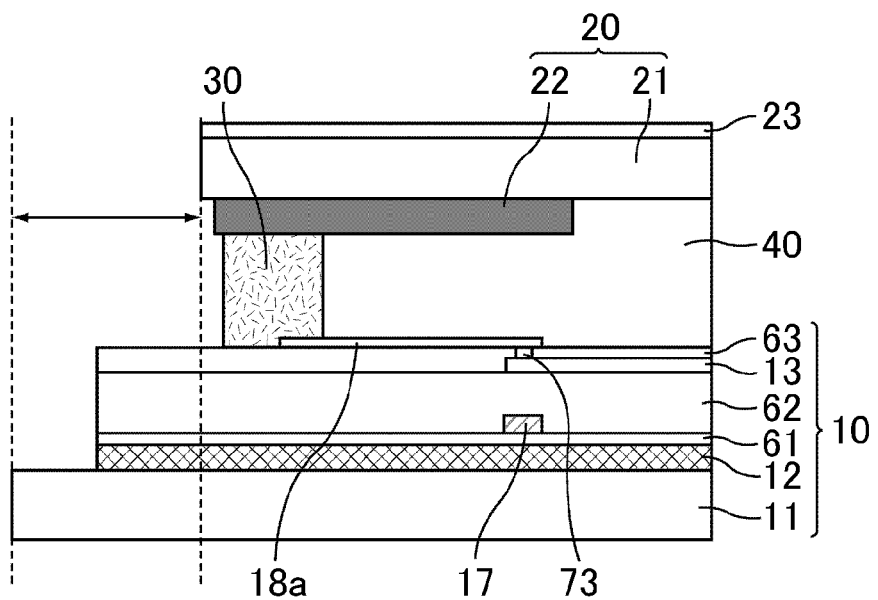
FIG. 10 is a cross sectional schematic view showing a first example of a liquid crystal display panel of Embodiment 2.

FIG. 10 is a cross sectional schematic view showing a first example of the liquid crystal display panel of Embodiment 2. In the first example of Embodiment 2, an electrode 18a formed in the same layer as the pixel electrode is used as the electrode that is isolated from the common electrode 13 and is electrically connected to the common electrode 13. The common electrode 13 and the electrode 18a formed in the same layer as the pixel electrode are electrically interconnected via a contact portion 73 formed in the third insulating film 63.

Figure 11:
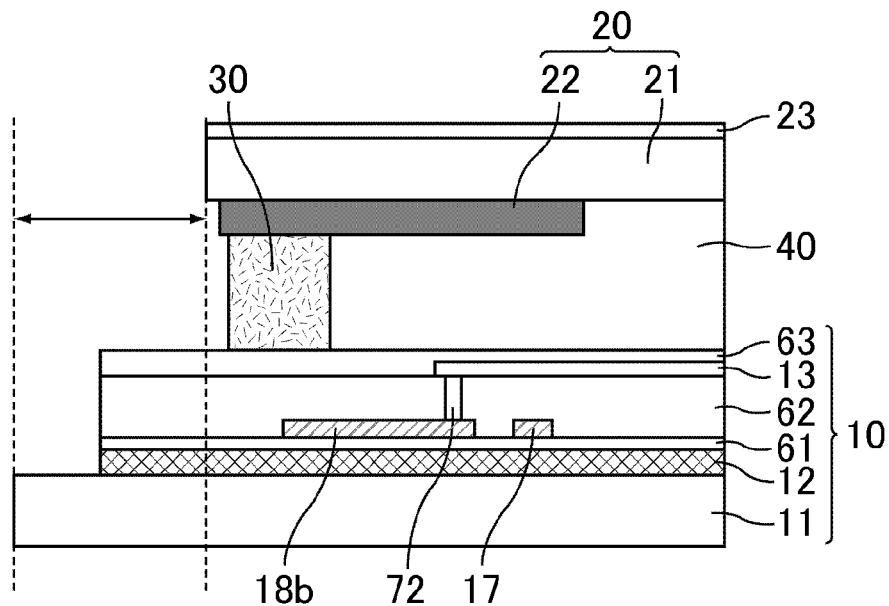
FIG. 11 is a cross sectional schematic view showing a second example of the liquid crystal display panel of Embodiment 2.

FIG. 11 is a cross sectional schematic view showing a second example of the liquid crystal display panel of Embodiment 2. In the second example of Embodiment 2, an electrode 18b formed in the same layer as the common lead-out wire 17 is used as the electrode that is isolated from the common electrode 13 and is electrically connected to the common electrode 13. The common electrode 13 and the electrode 18b formed in the same layer as the common lead-out wire 17 are electrically interconnected via the contact portion 72 formed in the second insulating film 62.

Embodiment 3

A liquid crystal display panel of Embodiment 3 is the same as the liquid crystal display panel of Embodiment 1, except that the space between the common lead-out wire and the seal area is covered not only with the common electrode but also with the electrode that is isolated from the common electrode and is electrically connected to the common electrode.

Figure 12:
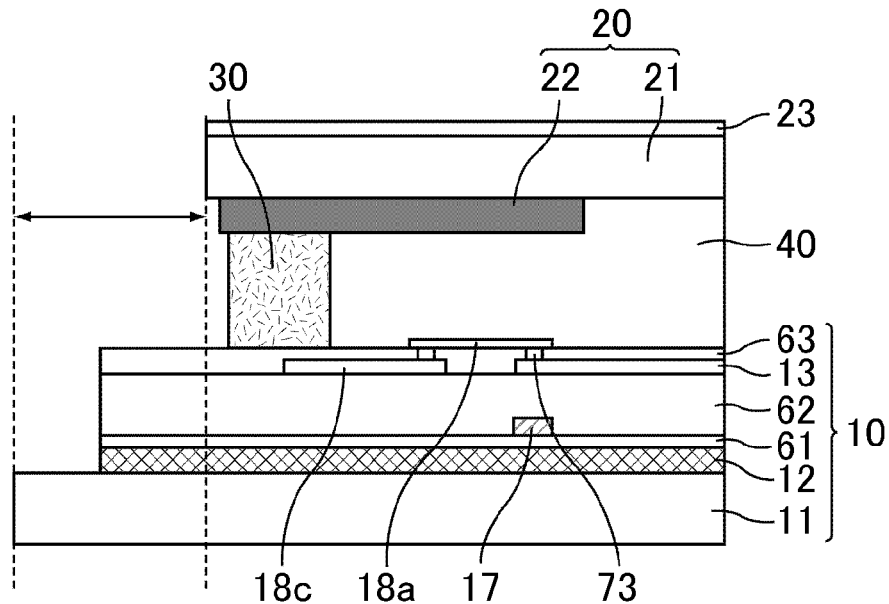
FIG. 12 is a cross sectional schematic view showing a first example of a liquid crystal display panel of Embodiment 3.

FIG. 12 is a cross sectional schematic view showing a first example of a liquid crystal display panel of Embodiment 3. In the first example of Embodiment 3, the electrode 18a formed in the same layer as the pixel electrode 14 and an electrode 18c formed in the same layer as the common electrode 13 are used as the electrodes that are isolated from the common electrode 13 and are electrically interconnected to the common electrode 13. The common electrode 13 and the electrode 18a formed in the same layer as the pixel electrode 14 are electrically interconnected via the contact portion 73 formed in the third insulating film 63. The common electrode 13 and the electrode 18c formed in the same layer as the common electrode 13 are electrically interconnected via the electrode 18a formed in the same layer as the pixel electrode 14 and two contact portions 73 formed in the third insulating film 63.

Figure 13:
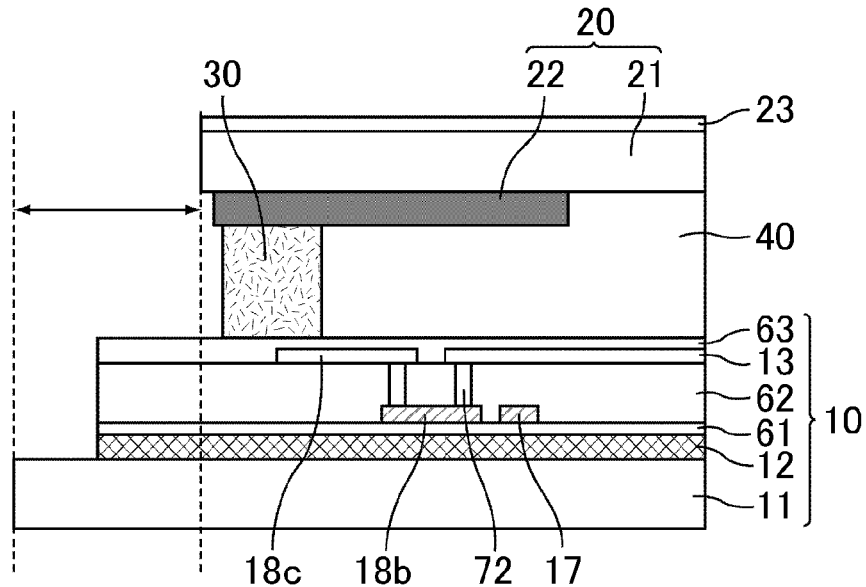
FIG. 13 is a cross sectional schematic view showing a second example of the liquid crystal display panel of Embodiment 3.

FIG. 13 is a cross sectional schematic view showing a second example of the liquid crystal display panel of Embodiment 3. In the second example of Embodiment 3, the electrode 18b formed in the same layer as the common lead-out wire 17 and the electrode 18c formed in the same layer as the common electrode 13 are used as the electrodes that are isolated from the common electrode 13 and are electrically connected to the common electrode 13. The common electrode 13 and the electrode 18b formed in the same layer as the common lead-out wire 17 are electrically interconnected via the contact portion 72 formed in the second insulating film 62.

The common electrode 13 and the electrode 18c formed in the same layer as the common electrode 13 are electrically interconnected via the electrode 18b formed in the same layer as the common lead-out wire 17 and two contact portions 72 formed in the second insulating film 62.

Depending on the design, the area between the common lead-out wire and the seal area may be covered with the entire electrodes located in the multiple layers as described above.

Embodiment 4

A liquid crystal display panel of Embodiment 4 is the same as the liquid crystal display panel of Embodiment 1, except that the black matrix is formed so as not to overlap the entire sealing material. As described above, when the sealing material and the black matrix partially overlap each other, the sealing material cannot be irradiated with ultraviolet light through the counter substrate for curing. Therefore, in Embodiment 4, a portion where the black matrix does not overlap the sealing material is provided.

Figure 14:
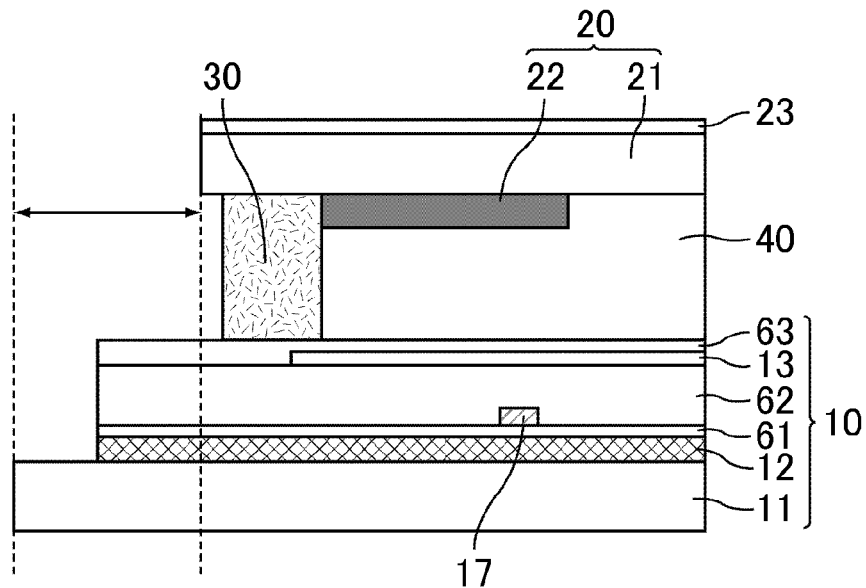
FIG. 14 is a cross sectional schematic view showing a first example of a liquid crystal display panel of Embodiment 4.

FIG. 14 is a cross sectional schematic view showing a first example of the liquid crystal display panel of Embodiment 4. In the first example of Embodiment 4, the sealing material 30 and the black matrix 22 are formed so as not to overlap each other. In this case, the sealing material 30 can be irradiated with ultraviolet light through the counter substrate 20 for curing. Thus, the sealing material can be more quickly and more reliably cured.

Figure 15:
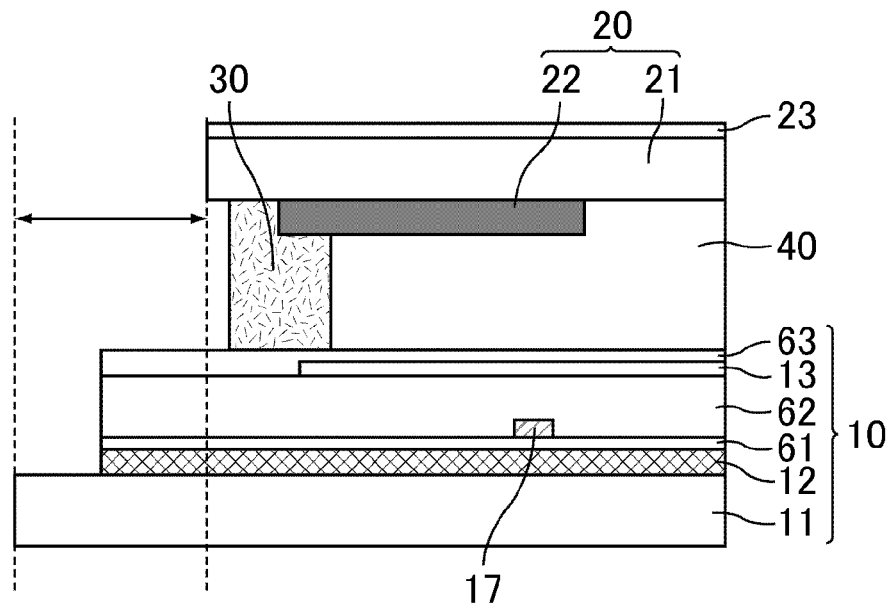
FIG. 15 is a cross sectional schematic view showing a second example of the liquid crystal display panel of Embodiment 4.
Figure 16:
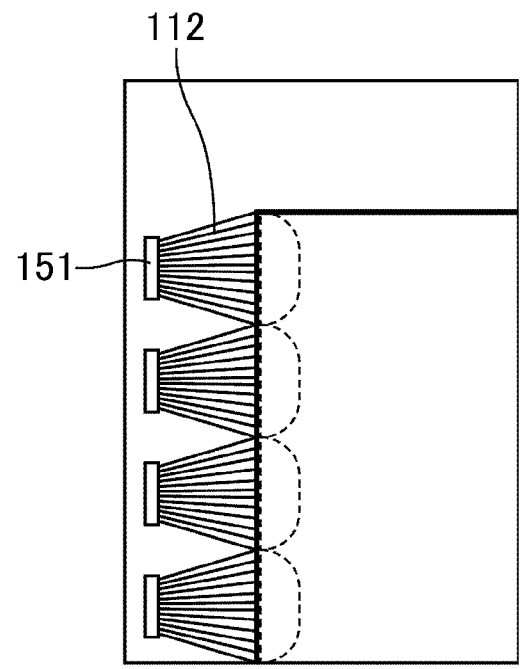
FIG. 16 is a plan schematic view showing the occurrence of display unevenness near gate lead-out wires.
Figure 17:
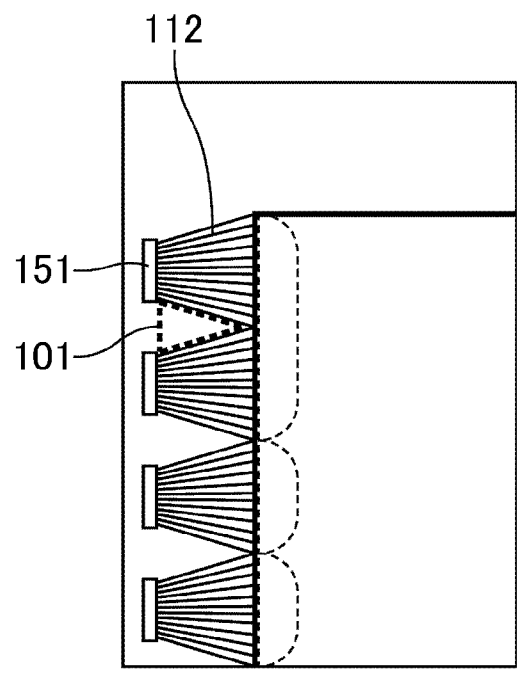
FIG. 17 is a plan schematic view showing the occurrence of display unevenness near the gate lead-out wires.

FIG. 15 is a cross sectional schematic view showing a second example of the liquid crystal display panel of Embodiment 4. In the second example of Embodiment 4, the sealing material 30 and the black matrix 22 are formed so as to partially overlap each other. In this case, the sealing material 30 is preferably irradiated with ultraviolet light for curing through the TFT substrate 10 but not through the counter substrate 20. Also in this case, the gate lead-out wire 12 is preferably provided with slits as shown in the third modified example of Embodiment 1.

The liquid crystal display panel of the present invention has been described in Embodiments 1 to 4 above. Each embodiment and its modified examples can be employed in appropriate combination.

REFERENCE SIGNS LIST

10: TFT substrate
11, 21: supporting substrate
12, 112: gate signal line, gate lead-out wire
12a: first gate lead-out wire
12b: second gate lead-out wire
13: common electrode
14: pixel electrode
14a: slits in the pixel electrode
16: source signal line, source lead-out wire
17: common lead-out wire
17a: first common lead-out wire
17b: second common lead-out wire
18a: electrode formed in the same layer as the pixel electrode
18b: electrode formed in the same layer as the common lead-out wire
18c: electrode formed in the same layer as the common electrode
20: counter substrate
22: black matrix
23: shield electrode
30: sealing material
40: liquid crystal layer
51, 151: gate driver (gate signal output circuit)
51a: first gate driver
51b: second gate driver
52: source driver (source signal output circuit)
54: TFT (thin film transistor)
55: semiconductor layer
56a, 56b: opening
57: first common signal line
61: first insulating film
62: second insulating film
63: third insulating film
71, 74: contact portion (in the first insulating film)
72: contact portion (in the second insulating film)
73: contact portion (in the third insulating film)
81: electrode located in the same layer as the gate lead-out wire
81a: slit in the electrode located in the same layer as the gate lead-out wire
101: floating island area

The invention claimed is:
1. A liquid crystal display panel comprising:
a pair of substrates;
a sealing material; and
a liquid crystal layer enclosed by the pair of substrates and the sealing material,
wherein one of the pair of substrates includes a pixel electrode provided with multiple slits, and a flat plate-shaped common electrode located on a different layer from the pixel electrode, with an insulating film between the pixel electrode and the common electrode,
a non-display area includes a gate driver, multiple gate lead-out wires extending from the gate driver toward a display area, and a common lead-out wire electrically connected to the common electrode,
the common lead-out wire intersects the multiple gate lead-out wires, and the common electrode covers an area between the common lead-out wire intersecting the multiple gate lead-out wires and a part of the perimeter of the display area along the common lead-out wire.
2. The liquid crystal display panel according to claim 1,
wherein the sealing material is provided at a position further away from the display area than the common lead-out wire,
a part of the sealing material intersects the multiple gate lead-out wires, and
the common electrode further covers an area between a part of the sealing material intersecting the multiple gate lead-out wires and the common lead-out wire along a part of the perimeter of the display area.
3. The liquid crystal display panel according to claim 1,
wherein the sealing material is provided at a position further away from the display area than the common lead-out wire,
a part of the sealing material intersects the multiple gate lead-out wires, and
an electrode isolated from the common electrode and electrically connected to the common electrode covers an area between a part of the sealing material intersecting the multiple gate lead-out wires and the common lead-out wire along a part of the perimeter of the display area.
4. The liquid crystal display panel according to claim 3,
wherein the electrode isolated from the common electrode and electrically connected to the common electrode is an electrode located on the same layer as the pixel electrode.

5. The liquid crystal display panel according to claim 3, wherein the electrode isolated from the common electrode and electrically connected to the common electrode is an electrode located on the same layer as the common electrode.

6. The liquid crystal display panel according to claim 3, wherein the electrode isolated from the common electrode and electrically connected to the common electrode is an electrode located on the same layer as the common lead-out wire.

7. The liquid crystal display panel according to claim 1, wherein the sealing material is provided at a position further away from the display area than the common lead-out wire,
a part of the sealing material intersects the multiple gate lead-out wires, and
a combination of the common electrode and an electrode isolated from the common electrode and electrically connected to the common electrode covers an area between a part of the sealing material intersecting the multiple gate lead-out wires and the common lead-out wire along a part of the perimeter of the display area.

8. The liquid crystal display panel according to claim 7, wherein the electrode isolated from the common electrode and electrically connected to the common electrode is an electrode located on the same layer as the pixel electrode.

9. The liquid crystal display panel according to claim 7, wherein the electrode isolated from the common electrode and electrically connected to the common electrode is an electrode located on the same layer as the common electrode.

10. The liquid crystal display panel according to claim 7, wherein the electrode isolated from the common electrode and electrically connected to the common electrode is an electrode located on the same layer as the common lead-out wire.

11. The liquid crystal display panel according to claim 1, wherein the counter substrate includes a black matrix, and the sealing material at least partially overlaps the black matrix.

12. The liquid crystal display panel according to claim 1, wherein an electrode located on the same layer as the multiple gate lead-out wires and overlapping the sealing material is provided with a slit.

13. The liquid crystal display panel according claim 1, wherein the counter substrate includes a black matrix, and the sealing material does not overlap the black matrix.

14. The liquid crystal display panel according to claim 1, wherein the gate driver is a first gate driver, the multiple gate lead-out wires led out from the gate driver are first multiple gate lead-out wires,
an area across the display area from the first gate drivers is provided with a second gate driver, second multiple gate lead-out wires extending from the second gate driver toward the display area, and a second common lead-out wire electrically connected to the common electrode,
the second common lead-out wire intersects the second multiple gate lead-out wires, and
the common electrode covers an area between the second common lead-out wire intersecting the second multiple gate lead-out wires and a part of the perimeter of the display area along the second common lead-out wire.

15. The liquid crystal display panel according to claim 1, wherein the one of the pair of substrates includes a thin film transistor, and the thin film transistor includes a semiconductor layer including an oxide semiconductor.

16. The liquid crystal display panel according to claim 15, wherein the oxide semiconductor contains indium, gallium, zinc and oxygen.

\* \* \* \* \*